(12) United States Patent
Hiraguchi

(10) Patent No.: US 7,104,490 B2
(45) Date of Patent: Sep. 12, 2006

(54) RECORDING TAPE CARTRIDGE

(75) Inventor: Kazuo Hiraguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/386,513

(22) Filed: Mar. 13, 2003

(65) Prior Publication Data

US 2003/0173443 A1    Sep. 18, 2003

(30) Foreign Application Priority Data

Mar. 15, 2002    (JP)    ............................. 2002-072987

(51) Int. Cl.
*G11B 23/107*    (2006.01)
(52) U.S. Cl. .................... 242/348.2; 360/132
(58) Field of Classification Search ............... 242/348, 242/348.2; 360/132
See application file for complete search history.

(56) References Cited

U.S. PATENT DOCUMENTS 4,452,406 A    6/1984    Richard 5,261,626 A * 11/1993    Hoge et al. .............. 242/348.2

* cited by examiner

*Primary Examiner*—John Q. Nguyen
(74) *Attorney, Agent, or Firm*—Sughrue Mion, PLLC

(57) ABSTRACT

A recording tape cartridge with high strength and resistance to deformation around an opening aperture of a case, which opening aperture is for drawing out recording tape. The recording tape cartridge is provided with a leader block at a distal end of a magnetic tape. Left and right peripheral portions of this leader block are defined by wall portions. The leader block is mounted and removed at a leader block-retaining portion, which is an opening portion which penetrates through the case vertically. An opening aperture for drawing out the magnetic tape from the case is formed at a base portion of the leader block-retaining portion. Because the wall portions are provided, the leader block-retaining portion does not have free-standing end portions at any of a front wall at a front wall side thereof, a ceiling plate and a floor plate, and strength of the leader block-retaining portion is high.

4 Claims, 12 Drawing Sheets

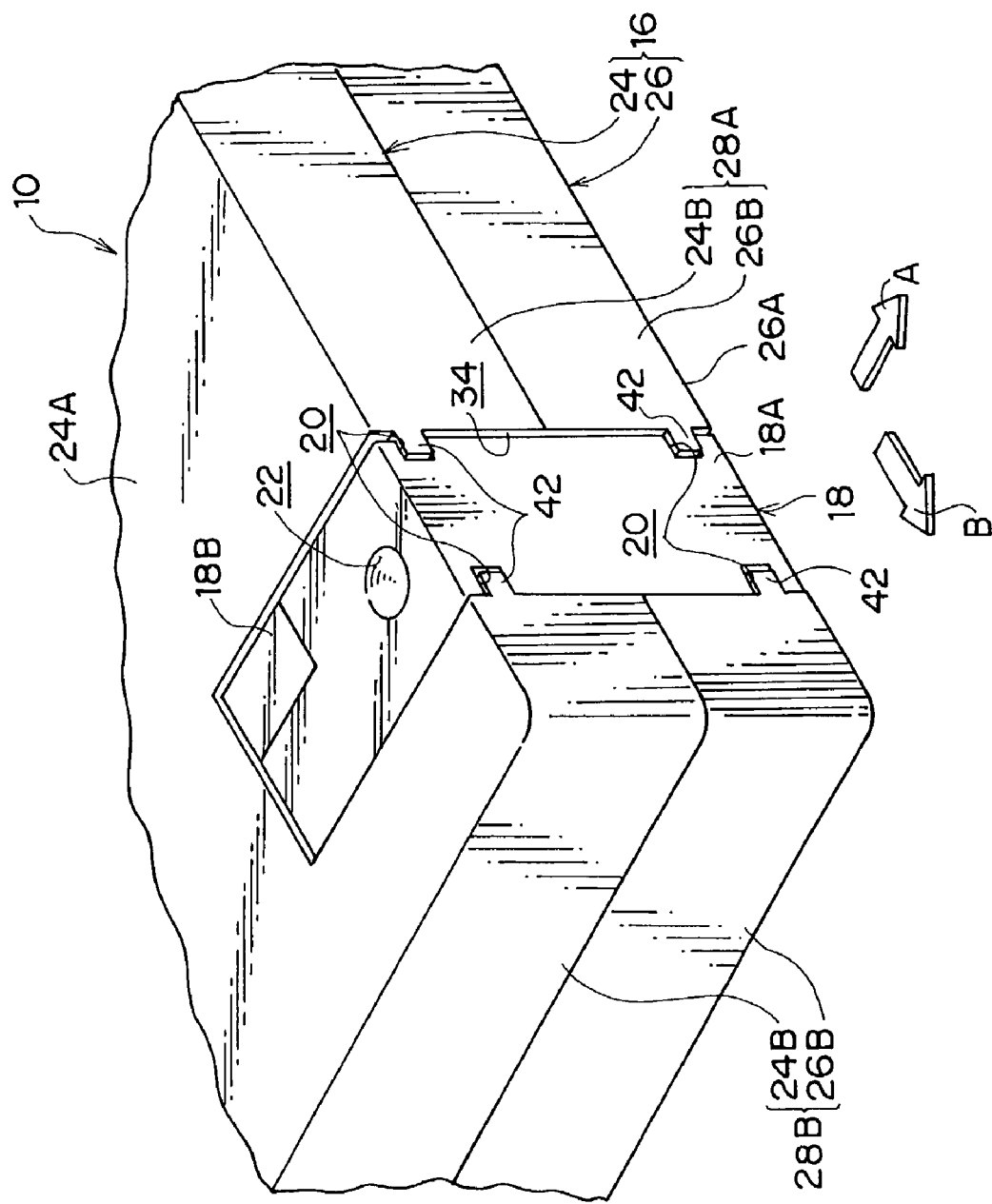

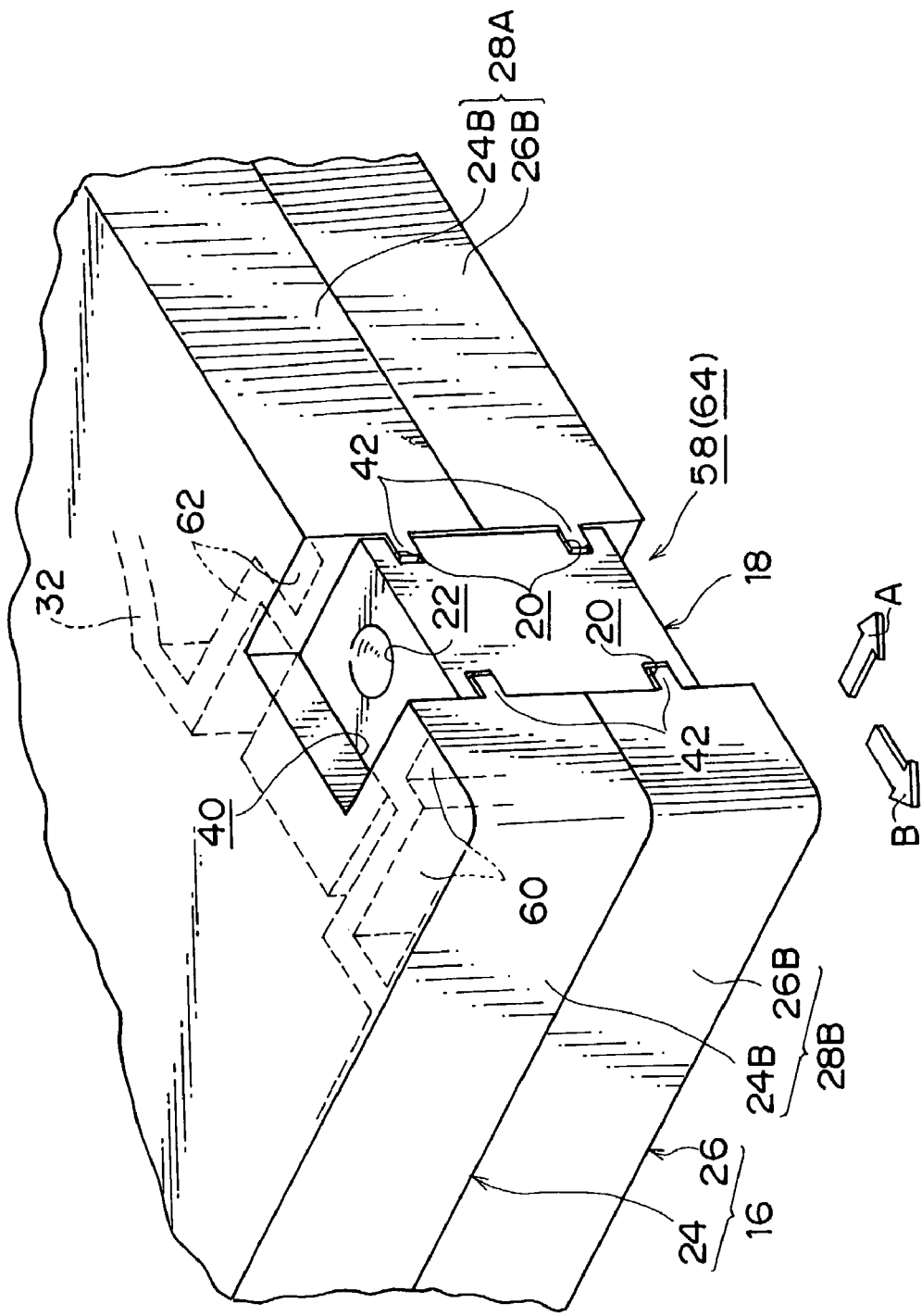

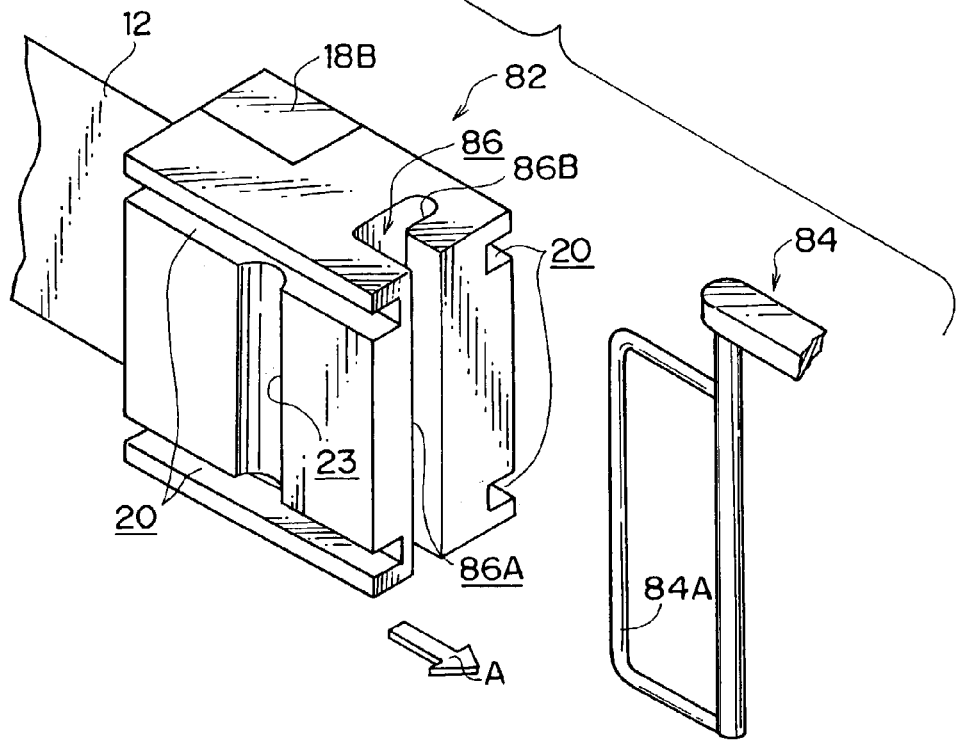
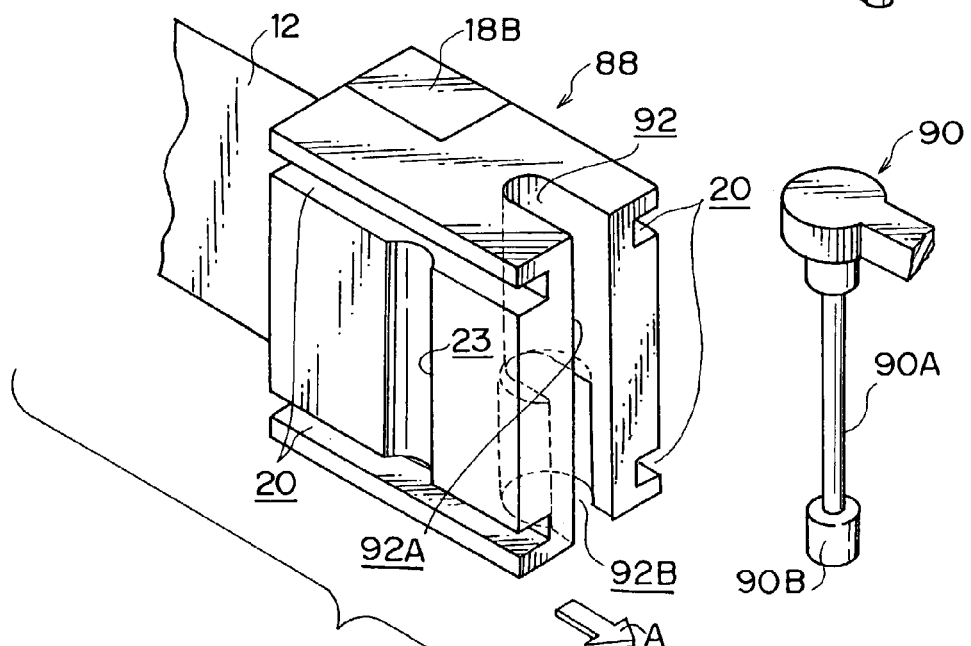
FIG.11A
FIG.11B

RECORDING TAPE CARTRIDGE

BACKGROUND OF THE INVENTION

1. Field of the Invention

The present invention relates to a recording tape cartridge which rotatably accommodates a single reel onto which a recording tape such as a magnetic tape or the like is wound.

2. Description of the Related Art

Recording tapes such as magnetic tapes and the like are used as external recording media for computers and the like. Because such recording tapes have large recording areas and are mainly employed for back-up of large volumes of information, it is desirable that the adherence of dust can be prevented and that accommodation space during storage is small.

Accordingly, recording tape cartridges in which a recording tape is wound on a single reel and rotatably accommodated in a case are employed. Thus, adherence of dust to the recording tape can be prevented by the case, and accommodation space during storage can be substantially halved in comparison with structures which are provided with a second reel around which the recording tape is wound during recording and/or replaying of information on the recording tape.

When recording of information to the recording tape and/or replay of information that has been recorded at the recording tape is to be carried out, the recording tape cartridge is loaded into a drive device, and the recording tape is sequentially drawn out from the case while being wound at a winding reel of the drive device. Hence, the recording tape is disposed along a predetermined tape path and recording and/or replay of the information is achieved by a recording/replaying head of the drive device.

Accordingly, at this recording tape cartridge, an opening aperture portion for drawing out the recording tape is provided in the case, and a leader member for drawing-out operation is provided at a distal end of the recording tape. Below, an example of such a recording tape cartridge is described on the basis of FIGS. 12A and 12B.

FIG. 12A shows a perspective view of a corner portion of a recording tape cartridge 100. FIG. 12B shows a sectional plan view of a corner portion of a case 102 which structures the recording tape cartridge 100. As shown in these drawings, an opening 104, which is formed by diagonally cutting away the corner portion, is formed in the case 102. A leader block-retaining portion (opening portion) 108, whose inner periphery is defined by a corner wall 106, is provided inward from the opening 104. The leader block-retaining portion 108 is defined from above and below by tongue portions 110 and 112, which are provided extending from a ceiling plate and floor plate, respectively, of the case 102.

A window portion (opening) 114, which communicates with the opening 104, is formed in the corner wall 106. A magnetic tape 118, which is a recording tape wound on a single reel 116 accommodated in the case 102, can be drawn out through the window portion 114 and opening 104. A leader block 120 is connected to a distal end of the magnetic tape 118. When the magnetic tape 118 is not in use, the leader block 120 is accommodated and retained at the leader block-retaining portion 108. When the magnetic tape 118 is to be used, the leader block 120 is operated by drawing-out means of the drive device, is taken out from the leader block-retaining portion 108, and is guided to the winding reel.

In the state in which the leader block 120 is accommodated at the leader block-retaining portion 108, the leader block 120 is in a state of abutting against the corner wall 106, and a rear corner portion 120A of the leader block 120 engages with a protrusion portion 124 formed at a free-standing end portion of a side wall 122 of the case 102. A front end portion 120B of the leader block 120 is engaged with a leaf spring portion 128 formed at a free-standing end portion of a front wall 126 of the case 102. In this state, the leader block 120 closes off the window portion 114.

When the leader block 120 is to be taken out from the leader block-retaining portion 108, the leader block 120 is rotated by the drawing-out means, in the direction of arrow C, around an engagement position of the rear corner portion 120A and the protrusion portion 124. Hence, the leader block 120 elastically deforms the leaf spring portion 128 engaging with the front end portion 120B in the direction of arrow D, passes through the opening 104, and is removed from the leader block-retaining portion 108. Further, the leader block 120 is accommodated and retained back in the leader block-retaining portion 108 by an opposite operation.

Thus, in this structure, removal of the leader block 120 from the leader block-retaining portion 108 is prevented simply by engaging the front end portion 120B and rear corner portion 120A of the leader block 120 with the protrusion portion 124 and leaf spring portion 128 of the case 102, and the leader block 120 is easily attached and detached at the leader block-retaining portion 108 by a small operational (rotating) force of the drawing-out means.

However, in the conventional recording tape cartridge 100 described above, there is a problem in that strength of a periphery around the opening 104 is low, because edge portions of the opening 104 are defined by respective free-standing end portions of the tongue portions 110 and 112, the side wall 122, and the front wall 126 (the leaf spring portion 128).

Consequently, if, for example, the recording tape cartridge 100 is dropped, peripheral edge portions of the opening 104 (the tongue portion 110, the leaf spring portion 128 and the like), which are provided at the corner portion of the case 102 and are susceptible to being impacted on a floor or the like, may be plastically deformed and/or damaged. This plastic deformation or damage is a cause of retention and mounting/removal of the leader block 120 at the leader block-retaining portion 108 inward from the opening 104 becoming impossible (making re-use impossible).

Moreover, even in cases which do not result in plastic deformation of peripheral edge portions of the opening 104, for example, if the leaf spring portion 128 is elastically deformed by a falling impact, misplacement or falling-out of the leader block 120 from the leader block-retaining portion 108 may occur, and dust and the like may adhere to the magnetic tape 118 as a result.

Furthermore, recording tape cartridges in which an opening provided in the side wall 122 or front wall 126 of the case 102 is opened/closed by a sliding door, hinge-type lid or the like are also known. However, edge portions of such openings are defined by respective free-standing end portions of the ceiling plate, floor plate and side wall or front wall of the case 102, and these recording tape cartridges have not caused an improvement in dropping strengths.

SUMMARY OF THE INVENTION

In consideration of the circumstances described above, an object of the present invention is to provide a recording tape cartridge which is high in strength and resistant to deformation at surroundings of an opening portion of a case, which opening portion is for drawing out recording tape.

In order to achieve the above-described object, in accordance with a first aspect of the present invention, a tape cartridge capable of being inserted at a tape drive which carries out at least one of reading and writing of data when the tape cartridge is inserted is provided. This tape cartridge includes: (I) a reel on which recording tape is wound; (II) a leader block to which a free end of the tape is attached; (III) a hollow case accommodating the reel, the case including a ceiling plate and a floor plate, which face one another with a predetermined spacing, and a peripheral wall which joins outer peripheries of the ceiling plate and floor plate; and (IV) a leader block-retaining portion including a recess locality formed in the case so as to extend into the ceiling plate, the floor plate and the peripheral wall, the recess locality including a pair of wall bodies which oppose one another and an opening aperture formed between case inward side end portions of the two wall bodies, the recess locality being capable of accommodating the leader block, and the opening aperture being covered by the leader block when the leader block is accommodated.

BRIEF DESCRIPTION OF THE DRAWINGS

FIG. 3 is a perspective view showing a state in which a leader block is accommodated and retained at the leader block-retaining portion of the recording tape cartridge relating to the embodiment of the present invention.

FIG. 8 is a perspective view showing a further variant example of the leader block-retaining portion relating to the fourth or fifth variant example of the recording tape cartridge relating to the embodiment of the present invention.

FIG. 11A is a perspective view showing a leader block relating to a seventh variant example of the recording tape cartridge relating to the embodiment of the present invention.

FIG. 11B is a perspective view showing a leader block relating to an eighth variant example of the recording tape cartridge relating to the embodiment of the present invention.

DESCRIPTION OF THE PREFERRED EMBODIMENTS

A recording tape cartridge 10 relating to an embodiment of the present invention will be explained on the basis of FIGS. 1 to 4. Note that, for convenience of explanation, a direction of loading of the recording tape cartridge 10 into a drive device (the direction of arrow A shown in FIG. 1 and the like as appropriate) is taken to be a forward direction, and the direction of an arrow B, which intersects the arrow A, is taken to be a rightward direction.

Figure 1:
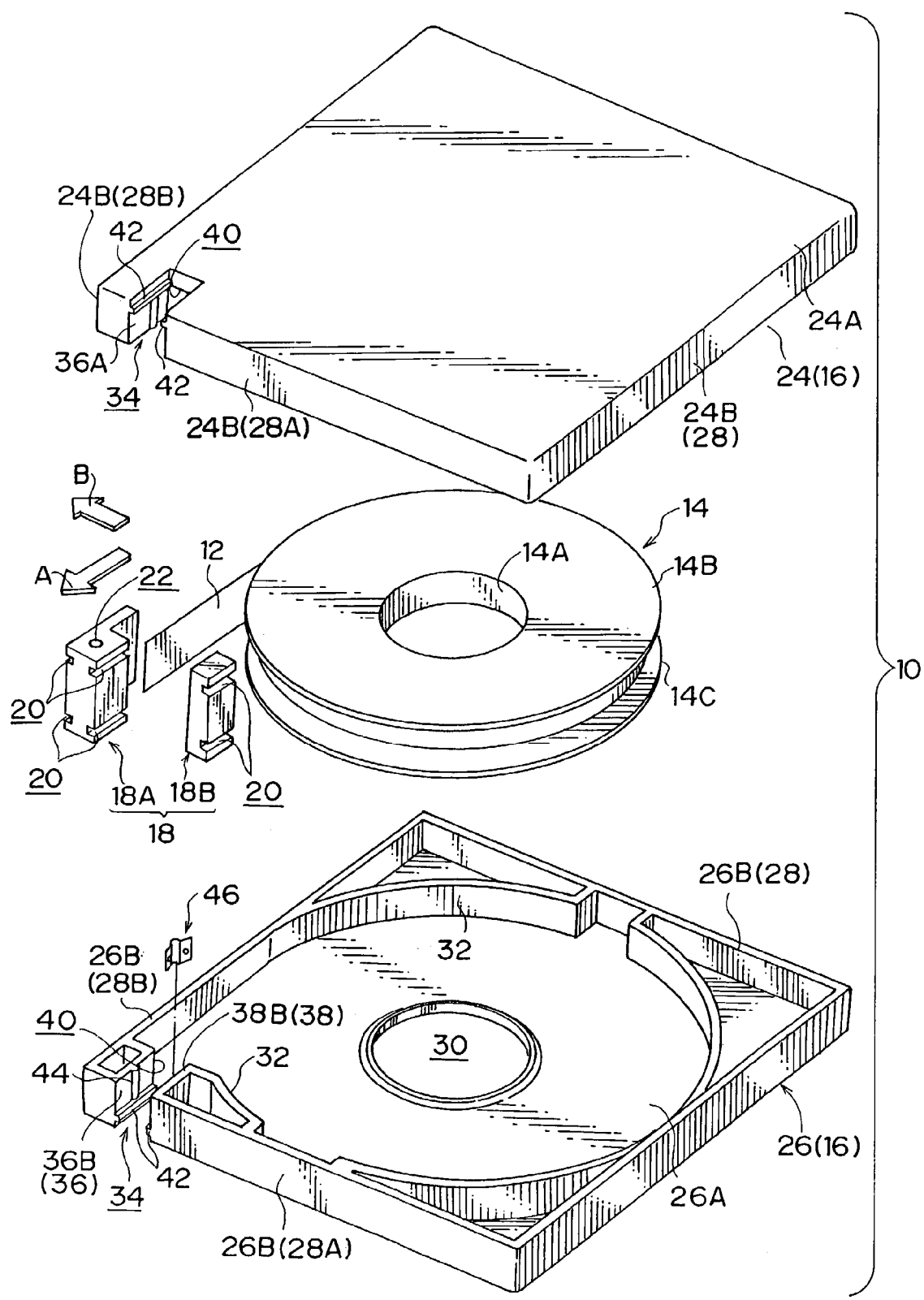
FIG. 1 is a schematic exploded perspective view showing overall structure of a recording tape cartridge relating to an embodiment of the present invention.

As is shown in a schematic exploded perspective view in FIG. 1, the recording tape cartridge 10 is structured with a single reel 14, on which is wound a magnetic tape 12 which serves as a recording tape which is an information recording/replaying medium. The reel 14 is rotatably accommodated in a case 16, which is substantially rectangular in plan view.

The reel 14 is integrally rotatably structured with a substantially cylindrical reel hub 14A, an upper flange 14B and a lower flange 14C. The upper flange 14B and lower flange 14C are respectively provided coaxially at vertical ends of the reel hub 14A. The magnetic tape 12 is wound round an outer peripheral portion of the reel hub 14A between the upper flange 14B and the lower flange 14C. A leader block 18 is connected at a free end of the magnetic tape 12.

The leader block 18 sandwiches a distal end of the magnetic tape 12 between a main body 18A and a clamp member 18B. The leader block 18 is formed overall in a substantially cuboid block shape. The main body 18A and the clamp member 18B are fitted together by adhesion, engaging unillustrated protrusion portions with recess portions, or the like.

Pairs of left and right guide grooves 20 are provided in upper and lower pairs (at four locations in total) traversing the whole length of the leader block 18 in a longitudinal direction of the magnetic tape 12. Engagement recess portions 22 are formed in respective upper and lower (in a transverse direction of the magnetic tape 12) end faces of the leader block 18. The engagement recess portions 22 are for engaging with engaging pins 48A of later-described drawing-out means 48. Further, as shown in FIG. 4A, a retention recess portion 23 is formed between the upper and lower guide grooves 20 at one of side end faces of the leader block 18 (a face facing rightward in a state in which the leader block 18 is retained at a later-described leader block-retaining portion 34). The retention recess portion 23 has a circular arc shape in sectional view. The retention recess portion 23 is for retention and positioning of the leader block 18 in the leader block-retaining portion 34.

The case 16 is formed in a substantially rectangular box shape by fitting together an upper case 24 and a lower case 26. Specifically, the upper case 24 has a ceiling plate 24A and an upper peripheral wall 24B, and the lower case 26 has a floor plate 26A and a lower peripheral wall 26B. An opening end of the upper peripheral wall 24B and an opening end of the lower peripheral wall 26B are matched up and fixed together. Thus, the hollow case 16 is structured. At this time, the upper peripheral wall 24B and the lower peripheral wall 26B may be adhered, and may be fixed with screws. A peripheral wall of the case 16, which is structured by the upper peripheral wall 24B and the lower peripheral wall 26B, is referred to as a peripheral wall 28.

A gear opening 30 is formed at a substantially central portion of the floor plate 26A of the case 16 (the lower case 26). The gear opening 30 is for exposing an unillustrated reel gear of the reel 14. The reel gear engages with a driving gear of the drive device, and the reel 14 is rotatingly driven in the case 16. The reel 14 is retained so as not to rattle by free play-restricting walls 32, which are respectively provided protruding from portions of inner faces of the upper case 24 and the lower case 26 along a circular path which is coaxial with the gear opening 30.

The leader block-retaining portion 34 is formed at a front end portion of the case 16 and slightly separated from a right end portion of the case 16, to serve as an opening portion. The leader block-retaining portion 34 is formed by respectively cutting a front wall 28A of the peripheral wall 28 (which faces in the direction of arrow A), the ceiling plate 24A and the floor plate 26A away in a three-sided box shape in plan view. Consequently, the leader block-retaining portion 34 opens respectively forwards, upwards and downwards (and vertically penetrates through the case 16).

Figure 2A:
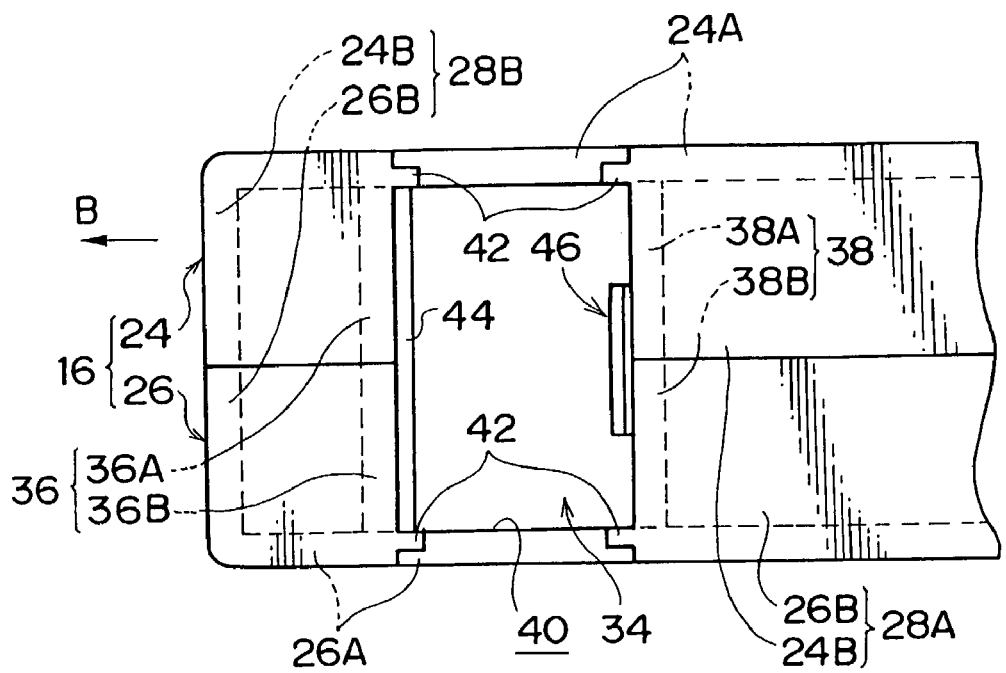
FIG. 2A is a front view showing a leader block-retaining portion and an opening of the recording tape cartridge relating to the embodiment of the present invention.
Figure 2B:
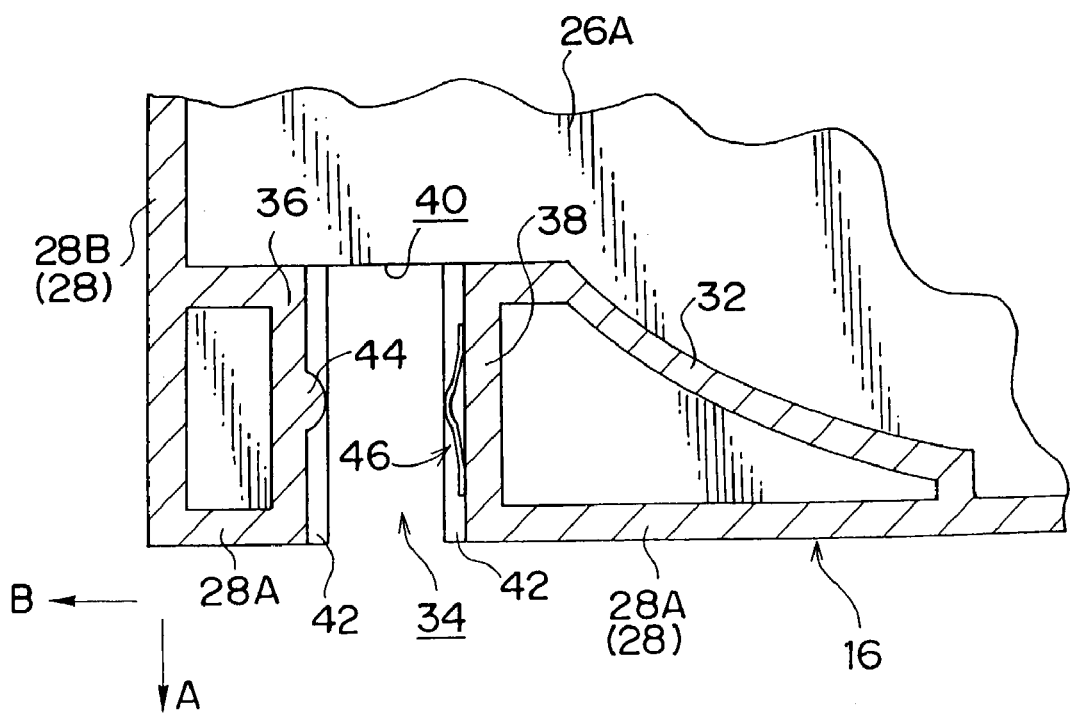
FIG. 2B is a sectional plan view showing the leader block-retaining portion and opening of the recording tape cartridge relating to the embodiment of the present invention.

As shown in FIGS. 2A and 2B, peripheral portions of the leader block-retaining portion 34 in the left-right direction are defined by a pair of wall bodies 36 and 38 which face one another and are each formed along the direction of arrow A. A facing separation between the wall bodies 36 and 38 is slightly greater than a width of the leader block 18 (the width in a direction of thickness of the sandwiched magnetic tape 12).

The wall body 36 defining the right periphery of the leader block-retaining portion 34 is structured by matching up an upper wall body 36A and a lower wall body 36B with one another. The upper wall body 36A is provided to be continuous (formed integrally) with and intersect both the ceiling plate 24A and the upper peripheral wall 24B that structures the front wall 28A. The lower wall body 36B is provided to be continuous with and intersect both the 26A and the lower peripheral wall 26B that structures the front wall 28A.

Thus, the wall body 36 extends rearward (inward of the case 16) from a right side opening end of the leader block-retaining portion 34 at the front wall 28A, and joins right side opening ends of the ceiling plate 24A and the floor plate 26A. A rear end of the wall body 36 corresponds with a rear end (inner end) of the leader block-retaining portion 34, and is inflected away from that rear end to connect with a right side wall 28B, which is a portion of the peripheral wall 28 that faces in the direction of arrow B.

On the other hand, the wall body 38 defining the left periphery of the leader block-retaining portion 34 is structured by matching up an upper wall body 38A and a lower wall body 38B with one another. The upper wall body 38A is provided to be continuous with and intersect both the ceiling plate 24A and the upper peripheral wall 24B that structures the front wall 28A. The lower wall body 38B is provided to be continuous with and intersect both the floor plate 26A and the lower peripheral wall 26B that structures the front wall 28A.

Thus, the wall body 38 extends rearward (inward of the case 16) from a left side opening end of the leader block-retaining portion 34 at the front wall 28A, and joins left side opening ends of the ceiling plate 24A and the floor plate 26A. A rear end of the wall body 38 corresponds with the rear end (inner end) of the leader block-retaining portion 34, and is inflected away from that rear end to connect with a portion of the free play-restricting walls 32.

At a seat portion of the leader block-retaining portion 34, an opening 40 for drawing-out of the magnetic tape 12 is formed at a portion surrounded by respective rear side opening ends of the ceiling plate 24A and floor plate 26A and respective rear end portions of the wall bodies 36 and 38. That is, upper and lower edge portions of the opening 40 are defined by the ceiling plate 24A and the floor plate 26A, and left and right edge portions of the opening 40 are defined by respective rear end portions of the wall bodies 36 and 38. Thus, a base side of the leader block-retaining portion 34 is formed. Consequently, the leader block-retaining portion 34 (the case 16) has a structure in which only the rear side opening ends of the ceiling plate 24A and the floor plate 26A defining the opening 40 are free-standing ends, and there are no free-standing end portions at the front wall 28A side.

At the wall bodies 36 and 38 of the leader block-retaining portion 34, rails 42, whose respective lengths are along the direction of arrow A, are provided protruding along the whole length of the leader block-retaining portion 34, at positions corresponding to the respective guide grooves 20 of the leader block 18. The rails 42 are respectively positioned to be slightly recessed from an outer face of the ceiling plate 24A or the floor plate 26A, and a lower end or upper end of each rail 42 substantially corresponds to an inner face of the ceiling plate 24A or floor plate 26A, respectively. That is, the rails 42 are provided within thickness ranges of the ceiling plate 24A and the floor plate 26A.

Between the upper and lower rails 42 at the wall body 36, a projection 44, which is formed in a circular arc shape in sectional view, is projectingly provided to correspond with the retention recess portion 23 of the leader block 18. On the other hand, a leaf spring 46 is attached between the upper and lower rails 42 of the wall body 38. The leaf spring 46 urges the leader block 18 toward the wall body 36 side (the projection 44 side).

The leader block 18 is mountable and removable at the leader block-retaining portion 34 described above, and the leader block 18 is retained at the leader block-retaining portion 34 when the magnetic tape 12 is not in use. Specifically, in this structure, the rails 42 are inserted at the guide grooves 20 and detachment of the leader block 18 from the leader block-retaining portion 34 in the vertical direction is prevented. At the same time, in a state in which the leader block 18 is positioned with the projection 44 inserted into the retention recess portion 23, the positioned state is maintained by urging force of the leaf spring 46, and the leader block 18 is retained.

In this state, an end face of the leader block 18 at the side at which the magnetic tape 12 is connected abuts against the rear side opening ends of the ceiling plate 24A and floor plate 26A defining the opening 40, and this end face closes off the opening 40. In this state, as shown in FIG. 3, dimensions of each component are defined such that a front end and upper and lower ends of the leader block 18 do not protrude beyond respective outer faces of the front wall 28A, the ceiling plate 24A and the floor plate 26A. Moreover, because the leader block-retaining portion 34 penetrates through the case 16 in the vertical direction, the engagement recess portions 22 of the leader block 18 are exposed in this retained state, and the drawing-out means 48 of the drive device can operate (access) the engagement recess portions 22.

Figure 4:
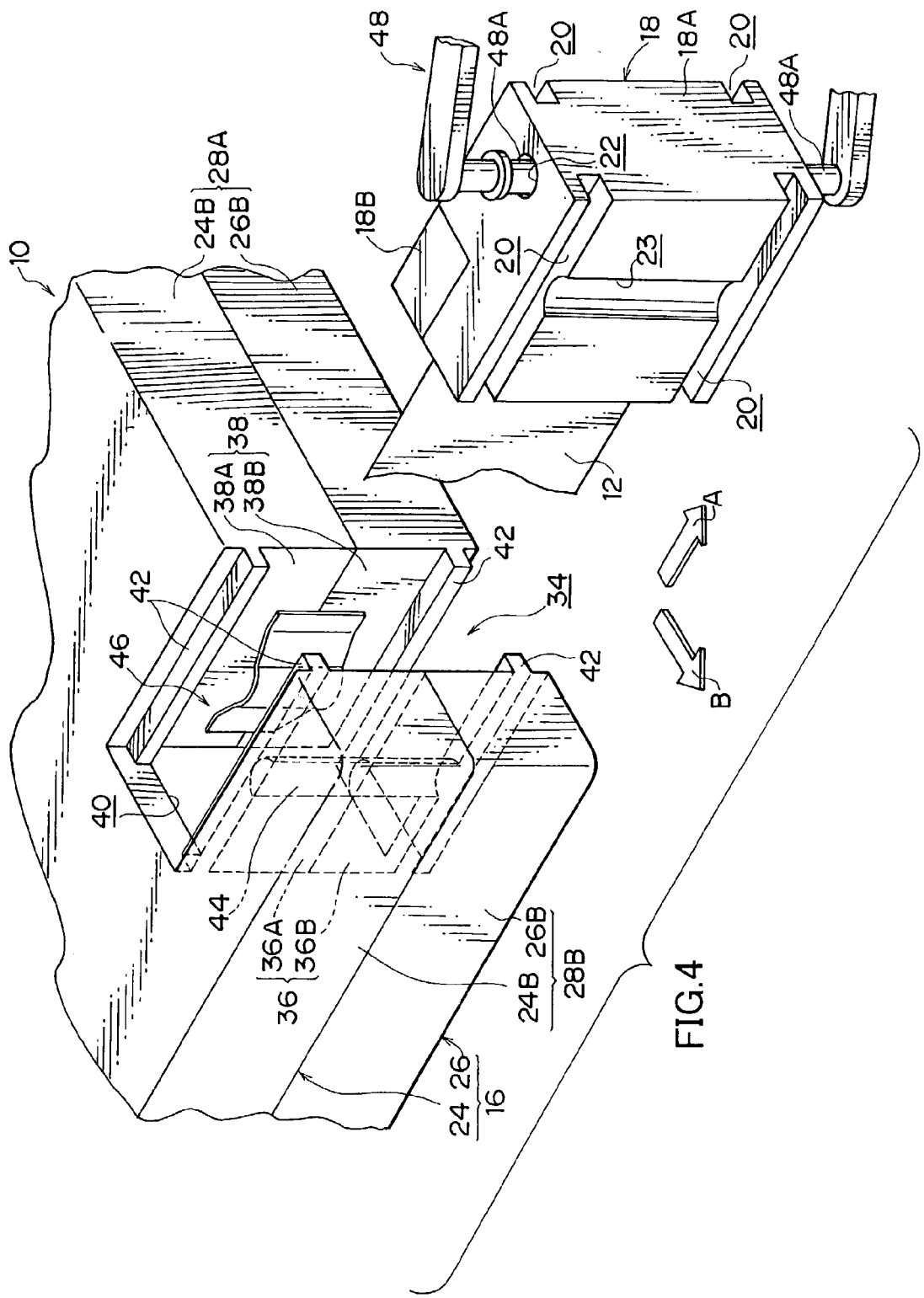
FIG. 4 is a perspective view showing a state in which the leader block is taken out from the leader block-retaining portion of the recording tape cartridge relating to the embodiment of the present invention.

In contrast, when the magnetic tape 12 is to be drawn out from the case 16, the pair of upper and lower engaging pins 48A provided at the drawing-out means 48 engage with (or possibly sandwich or grip) the engagement recess portions 22 of the leader block 18, as shown in FIG. 4, and the leader block 18 is taken out (separated) from the leader block-retaining portion 34.

At this time, movement of the leader block 18 in the left-right direction is restricted by the pair of wall bodies 36 and 38, and movement in the vertical direction (and the left-right direction) is restricted by the rails 42 inserted at the guide grooves 20. Thus, the leader block 18 is taken out from the leader block-retaining portion 34 along the direction of arrow A. The leader block 18 is structured to also move along the direction of arrow A when the leader block 18 is being put into the leader block-retaining portion 34 (in a direction opposite to the direction of arrow A).

Next, operation of the present embodiment will be described.

With the recording tape cartridge 10 of the structure described above, when the magnetic tape 12 is not in use, the leader block 18 is accommodated and held at the leader block-retaining portion 34, and the opening 40 is closed off by the leader block 18. Hence, ingression of dust and the like into the case 16 is prevented.

In contrast, when the magnetic tape 12 is to be used, the recording tape cartridge 10 is mounted into a drive device along the direction of arrow A. When the recording tape cartridge 10 is mounted at the drive device, each of the engaging pins 48A of the drawing-out means 48 is inserted at the pair of upper and lower engagement recess portions 22 of the leader block 18, and in this state the leader block 18 is pulled in the direction of arrow A. Consequently, the leader block 18 deforms the leaf spring 46 and disengages the projection 44 from the retention recess portion 23, and the leader block 18 is taken out from the leader block-retaining portion 34 (the case 16) substantially along the direction of arrow A.

The leader block 18 that has been taken out from the case 16 is guided to a winding reel of the drive device by the drawing-out means 48, and is accommodated at a reel hub of the winding reel. In this state, the leader block 18 rotates integrally with the winding reel and, while the magnetic tape 12 is wound onto the reel hub of the winding reel, the magnetic tape 12 is drawn out from the case 16 through the opening 40. At this time, the driving gear meshes with the reel gear and consequently the reel 14 of the recording tape cartridge 10 rotates contemporaneously with the winding reel.

Hence, recording of information onto the magnetic tape 12 and/or replaying of information that has been recorded at the magnetic tape 12 is performed by a recording head disposed along a predetermined tape path of the drive device.

Then, when the magnetic tape 12 that has been wound onto the winding reel is to be wound back to the reel 14, the reel 14 and the winding reel are driven to rotate in reverse. When the magnetic tape 12 has been wound all the way back to the reel 14, the leader block 18 is taken out from the reel hub of the winding reel by the drawing-out means 48, and mounted (accommodated and retained) at the leader block-retaining portion 34 of the case 16 (the recording tape cartridge 10).

Specifically, the leader block 18 is moved in the direction opposite to the direction of arrow A while being guided at the rails 42, which are inserted at the guide grooves 20 of the leader block 18, and the pair of wall bodies 36 and 38. The leader block 18 deforms the leaf spring 46 and the projection 44 enters into the retention recess portion 23.

Hence, the urging force of the leaf spring 46 pushes against the wall body, and detachment in the front-rear direction is prevented by the projection 44 which has entered into the retention recess portion 23. At the same time, detachment in the vertical direction is prevented by the rails 42 which have entered into the guide grooves 20. In other words, the leader block 18 is accommodated and retained at the leader block-retaining portion 34 in a state of being positioned in the left-right, front-rear and up-down directions. Furthermore, in this state, the leader block 18 abuts against the peripheral portions of the ceiling plate 24A and floor plate 26A that define the peripheral portions of the opening 40, and closes off the opening 40. Herein, the pair of left and right wall bodies 36 and 38 are provided connecting respective cutaway portions of the front wall 28A, ceiling plate 24A and floor plate 26A at the leader block-retaining portion 34. Therefore, no free-standing end portions of any of the front wall 28A, ceiling plate 24A and floor plate 26A are formed at corner portions of the leader block-retaining portion 34 in a vicinity of the front wall 28A, which corner portions are susceptible to being impacted against a floor, the ground or the like when the case 16 is dropped.

Therefore, around the leader block-retaining portion 34 of the case 16, strength is high and plastic deformation or damage due to dropping impacts is suppressed. In particular, deformation of the leader block-retaining portion 34 due to dropping impacts is further suppressed because the block-like leader block 18 is retained between the wall bodies 36 and 38. Furthermore, the opening 40 is provided at the seat portion of the leader block-retaining portion 34, and thus dropping impacts do not act directly on the opening 40, and deformation of the opening 40 is less likely to occur.

Thus, with the recording tape cartridge 10 relating to the present embodiment, strength is high and deformation is unlikely at the surroundings of the opening 40 for drawing out the magnetic tape 12.

Moreover, in this recording tape cartridge 10, the leader block-retaining portion 34 is disposed away from the corner portion of the case 16 that is most susceptible to impacts at the ground, a floor or the like at a time of droppage (for example, the corner portion between the front wall 28A and the right side wall 28B). Therefore, the corner portions of the leader block-retaining portion 34 in the vicinity of the front wall 28A are inherently less susceptible to impacts against the ground, floor or the like when dropped. As a result, plastic deformation, damage and the like of the leader block-retaining portion 34 due to dropping impacts are further suppressed, and portions surrounding the opening 40 are even less likely to be deformed.

Further again, with this recording tape cartridge 10, a direction of mounting and removing the leader block 18 is restricted to the direction of arrow A (a predetermined straight line direction) by the pair of wall bodies 36 and 38 and the rails 42 inserted at the guide grooves 20. Therefore, the leader block 18 is unlikely to fall out of the leader block-retaining portion 34 (the case 16) when the case 16 is dropped.

As described above, with this recording tape cartridge 10, the case 16 is less susceptible to being plastically deformed or damaged when dropped, and can survive to be used thereafter. In addition, the leader block 18 is unlikely to fall out, and maintains the closed state of the opening 40. Thus, adherence of dust and the like to the magnetic tape 12 (and loss of recorded information and the like) is prevented.

Next, variant examples of the embodiment described above will be described. First, variant examples of the leader block-retaining portion will be described, and then variant examples of the leader block will be described. Note that components and portions that are essentially the same as in the above embodiment are given the same reference numerals as in the above embodiment, and descriptions thereof are omitted.

Figure 5A:
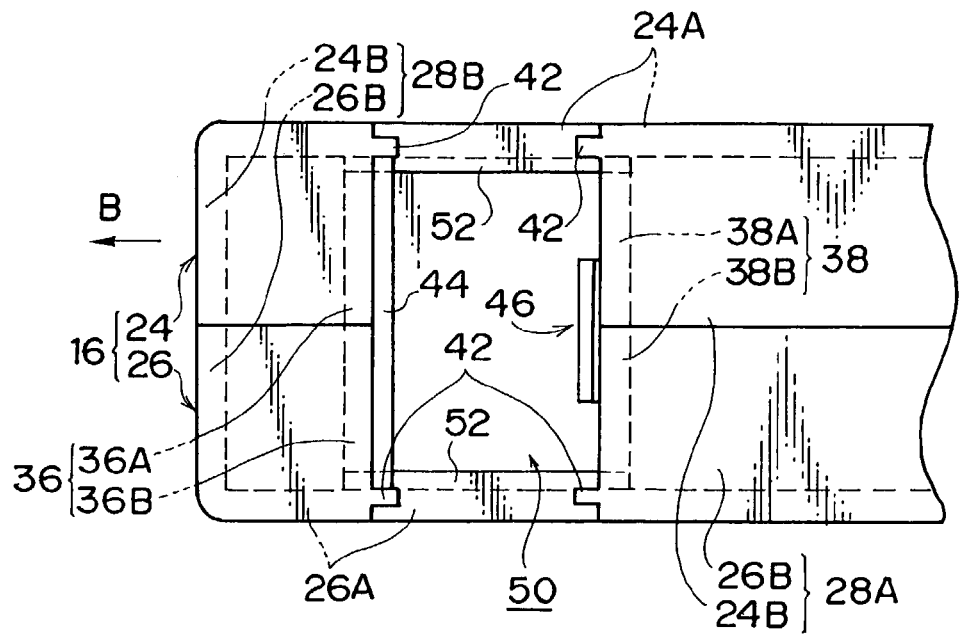
FIG. 5A is a front view showing a leader block-retaining portion relating to a first variant example of the recording tape cartridge relating to the embodiment of the present invention.
Figure 5B:
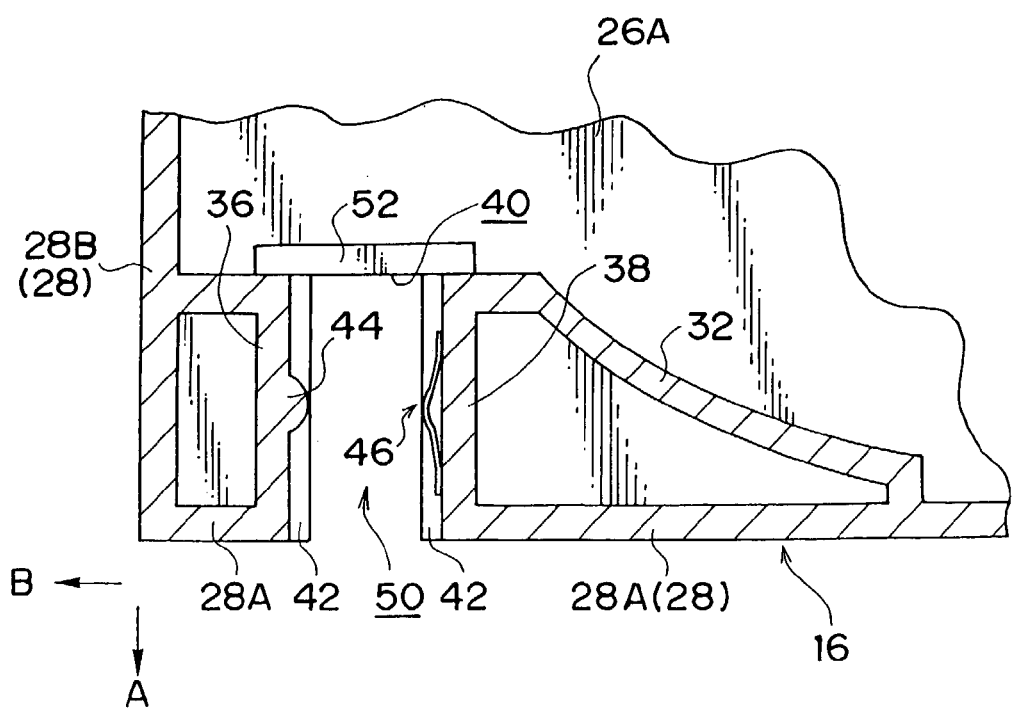
FIG. 5B is a sectional plan view showing the leader block-retaining portion relating to the first variant example of the recording tape cartridge relating to the embodiment of the present invention.

FIGS. 5A and 5B show a leader block-retaining portion 50 relating to a first variant example. The leader block-retaining portion 50 differs from the leader block-retaining portion 34 in that the leader block-retaining portion 50 is provided with ribs 52 at a seat portion thereof.

The ribs 52 protrude along the ceiling plate 24A and floor plate 26A respectively at the rear side opening end. Portions at both ends of the ribs 52 connect with rear ends of the wall bodies 36 and 38. Thus, the upper and lower ribs 52 define the upper and lower edge portions of the opening 40. Obviously, a facing separation between the upper and lower ribs 52 is greater than the width of the magnetic tape 12.

With the structure relating to this first variant example, because the ribs 52 are provided, in addition to all the same effects as are provided by the above embodiment, strength (stiffness) of the leader block-retaining portion 50 is further improved. Furthermore, because these ribs 52 define the upper and lower peripheral portions of the opening 40, rigidity of the surroundings of the opening 40 is improved.

Figure 6A:
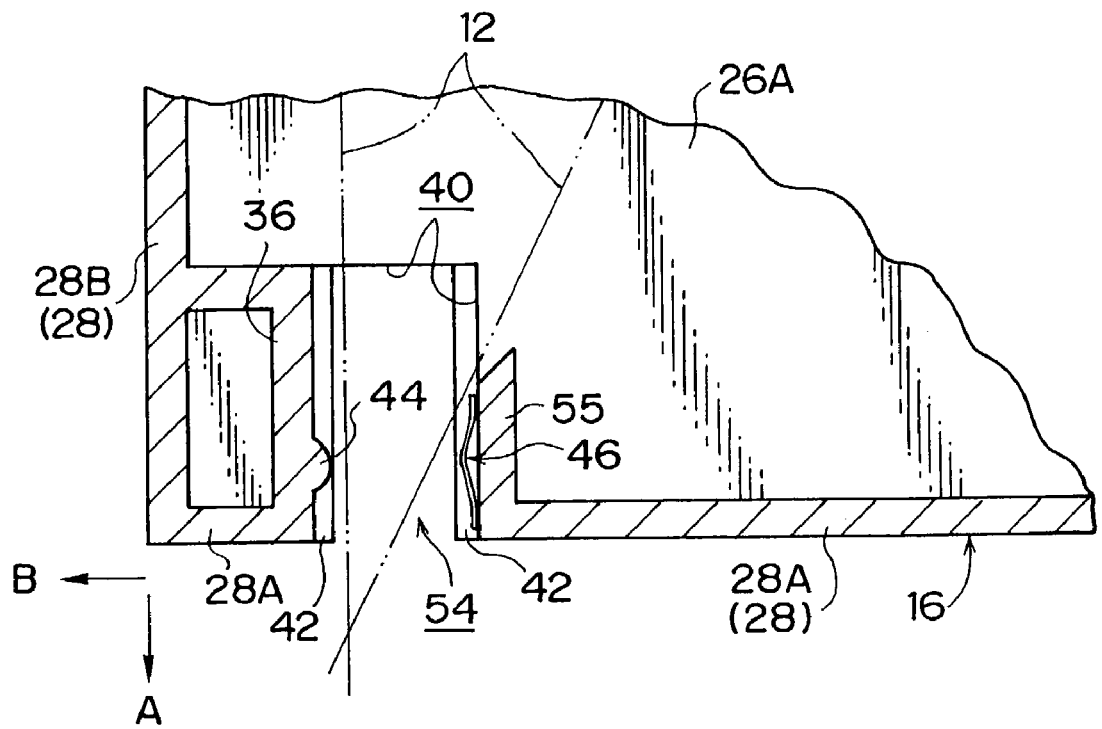
FIG. 6A is a sectional plan view showing a leader block-retaining portion relating to a second variant example of the recording tape cartridge relating to the embodiment of the present invention.

FIG. 6A shows a leader block-retaining portion 54 relating to a second variant example. The leader block-retaining portion 54 differs from the leader block-retaining portion 34 in that the leader block-retaining portion 54 is provided with a wall body 55 in place of the wall body 38. The wall body 55 is similar to the 38 in being provided joined with the front wall 28A and being joined with the ceiling plate 24A and the floor plate 26A. However, the wall body 55 differs from the wall body 38 in being shorter than the opposing wall body 36 (i.e., a rear end portion of the wall body 55 is positioned further forward than a rear end portion of the wall body 36).

Consequently, the opening 40 also opens between the ceiling plate 24A and the floor plate 26A rearward of the wall body 55. As a result, the magnetic tape 12 can be drawn out without interfering with the wall body 55 even in a case in which the range of a drawing-out path (path of travel) of the magnetic tape 12 is wide, as shown by imaginary lines in FIG. 6A. Thus, the reel hub 14A of the reel 14 can be reduced in diameter, and the length of the magnetic tape 12 that is wound on the reel 14 (and of a recording region) can be increased.

With a structure relating to this second variant example, in addition to all the same effects as are provided by the earlier-described embodiment, drawing-out paths of the magnetic tape 12 can correspond with a wide range, as described above. The wall body 55 may be provided to inflect at a rear portion thereof and connect with the free play-restricting walls 32, as is shown in FIG. 6B.

Figure 6B:
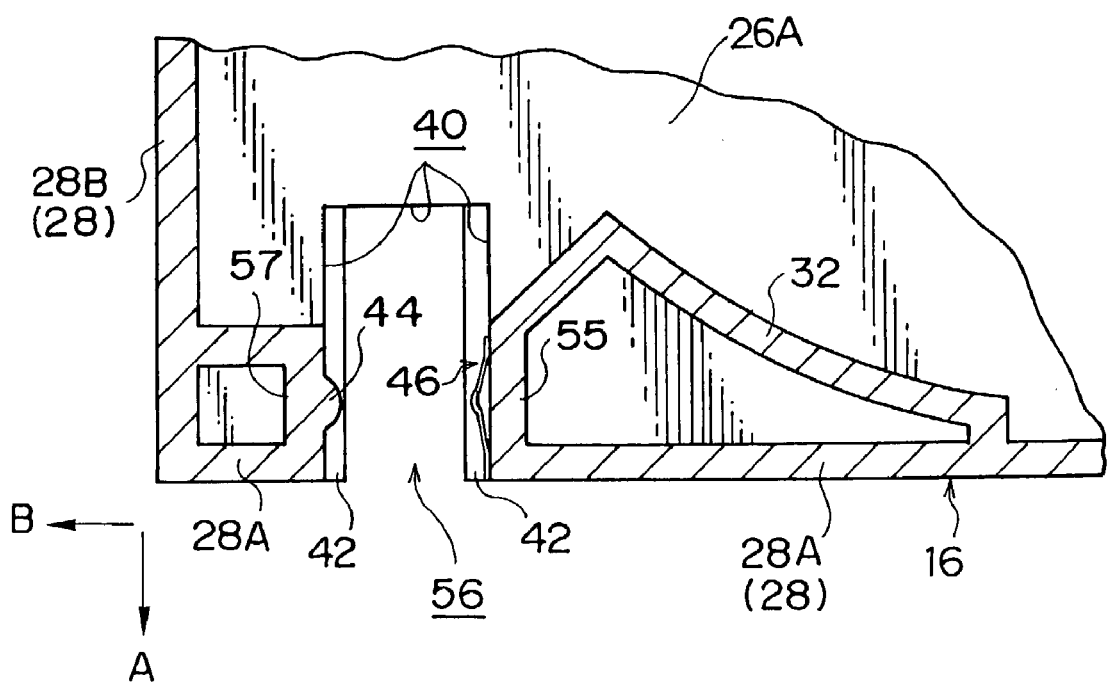
FIG. 6B is a sectional plan view showing a leader block-retaining portion relating to a third variant example of the recording tape cartridge relating to the embodiment of the present invention.

FIG. 6B shows a leader block-retaining portion 56 relating to a third variant example. The leader block-retaining portion 56 differs from the leader block-retaining portions 34 and 54 in that a wall body 57 is provided in place of the right side wall body 36. The wall body 57 is similar to the wall body 36 in being provided joined with the front wall 28A and joining with the ceiling plate 24A and the floor plate 26A. However, the wall body 57 differs from the wall body 36 in that the wall body 57 has the same length as the opposing wall body 55.

Consequently, the opening 40 also opens between the ceiling plate 24A and the floor plate 26A rearward of the wall body 57, and can respond to an increase in a maximum winding radius of the magnetic tape 12 on the reel 14. That is, with a structure relating to this third variant example, in addition to all the same effects as are provided by the earlier-described embodiment, drawing-out paths of the magnetic tape 12 can correspond with an even wider range, as described above.

Figure 7A:
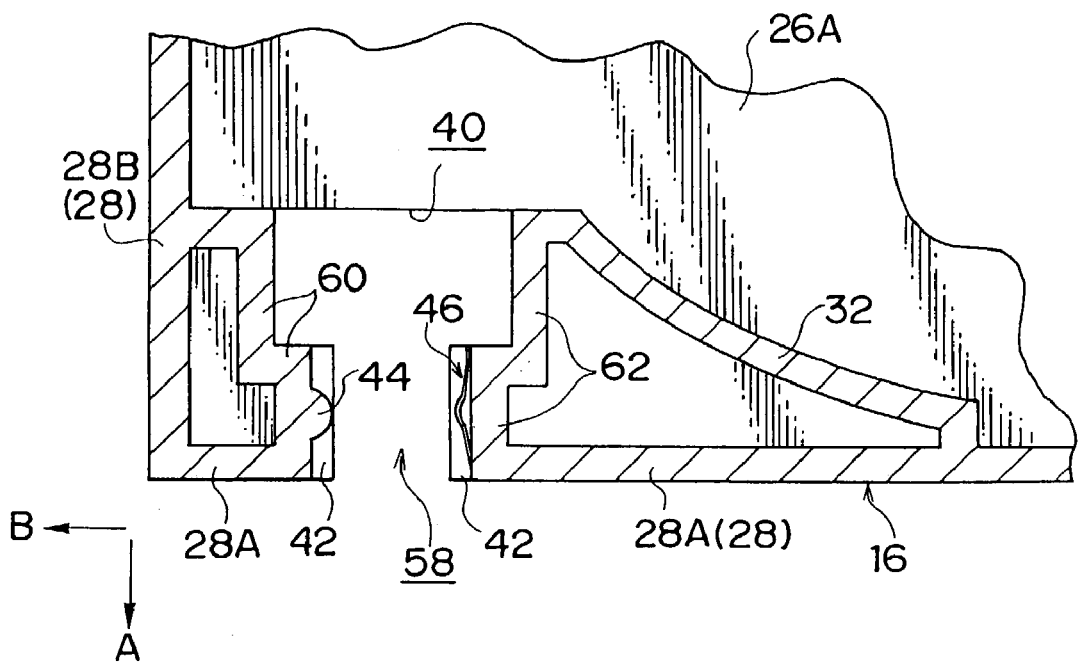
FIG. 7A is a sectional plan view showing a leader block-retaining portion relating to a fourth variant example of the recording tape cartridge relating to the embodiment of the present invention.

FIG. 7A shows a leader block-retaining portion 58 relating to a fourth variant example. The leader block-retaining portion 58 differs from the leader block-retaining portion 34 in that a pair of wall bodies 60 and 62 are provided in place of the pair of wall bodies 36 and 38. The wall bodies 60 and 62 are formed with steps such that a facing separation between the wall bodies 60 and 62 is wider at rear portions thereof.

Consequently, a rear portion of the leader block-retaining portion 58 is broad, and an opening width of the opening 40 becomes wider. Therefore, similarly to the leader block-retaining portion 56 relating to the aforementioned third variant example, the leader block-retaining portion 58 can respond to an increase in the maximum winding radius of the magnetic tape 12 on the reel hub 14A.

Figure 7B:
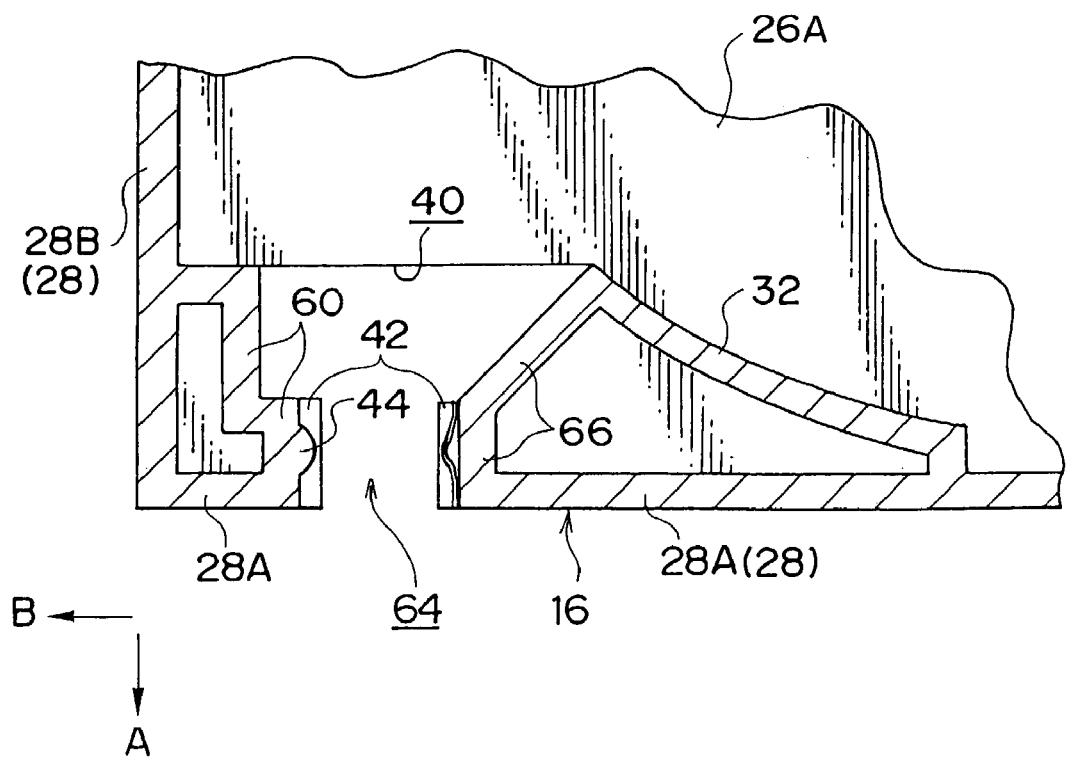
FIG. 7B is a sectional plan view showing a leader block-retaining portion relating to a fifth variant example of the recording tape cartridge relating to the embodiment of the present invention.

FIG. 7B shows a leader block-retaining portion 64 relating to a fifth variant example. The leader block-retaining portion 64 is provided with a wall body 66 in place of the wall body 62 of the leader block-retaining portion 58. A rear portion of the wall body 66 is angled in a direction such that the opening width of the opening 40 broadens. In this structure too, similarly to the leader block-retaining portions 56 and 58 relating to the aforementioned third and fourth variant examples, the leader block-retaining portion 64 can respond to a reduction in radius of the reel hub 14A and to an increase in the maximum winding radius of the magnetic tape 12 on the reel 14.

Thus, with structures relating to the fourth and fifth variant examples, in addition to all the same effects as are provided by the earlier-described embodiment, drawing-out paths of the magnetic tape 12 can correspond with an even wider range.

Furthermore, with the leader block-retaining portions 58 and 64 relating to the fourth and fifth variant examples, the opening width of the opening 40 is wider than an opening width at a front wall 28A side of the leader block-retaining portion 58 or 64. Consequently, the opening 40 cannot be closed off by the leader block 18. However, the structures of FIG. 8 and FIG. 9 can be employed in response thereto.

Specifically, as shown in FIG. 8, the leader block-retaining portion 58 or 64 may have a structure in which rear side opening ends of the ceiling plate 24A and floor plate 26A (the seat portion of the leader block-retaining portion 58 or 64) are respectively positioned further forward, and the wide region at the rear portion of the leader block-retaining portion 58 or 64 is covered over by the ceiling plate 24A and the floor plate 26A.

In such a case, the opening 40 is at a location defined by the step portions of the wall bodies 60 and 62 (or an inflection portion of the wall body 66) and the rear side opening ends of the ceiling plate 24A and floor plate 26A. This does not have any effect on the range of drawing-out paths of the magnetic tape 12. Consequently, the opening 40 can be closed off by the leader block 18. Thus, the wall bodies 60 and 62 and the like may be provided extending further into the case 16 than opening edges of the ceiling plate 24A and the like (peripheral portions of the opening 40).

Figure 9:
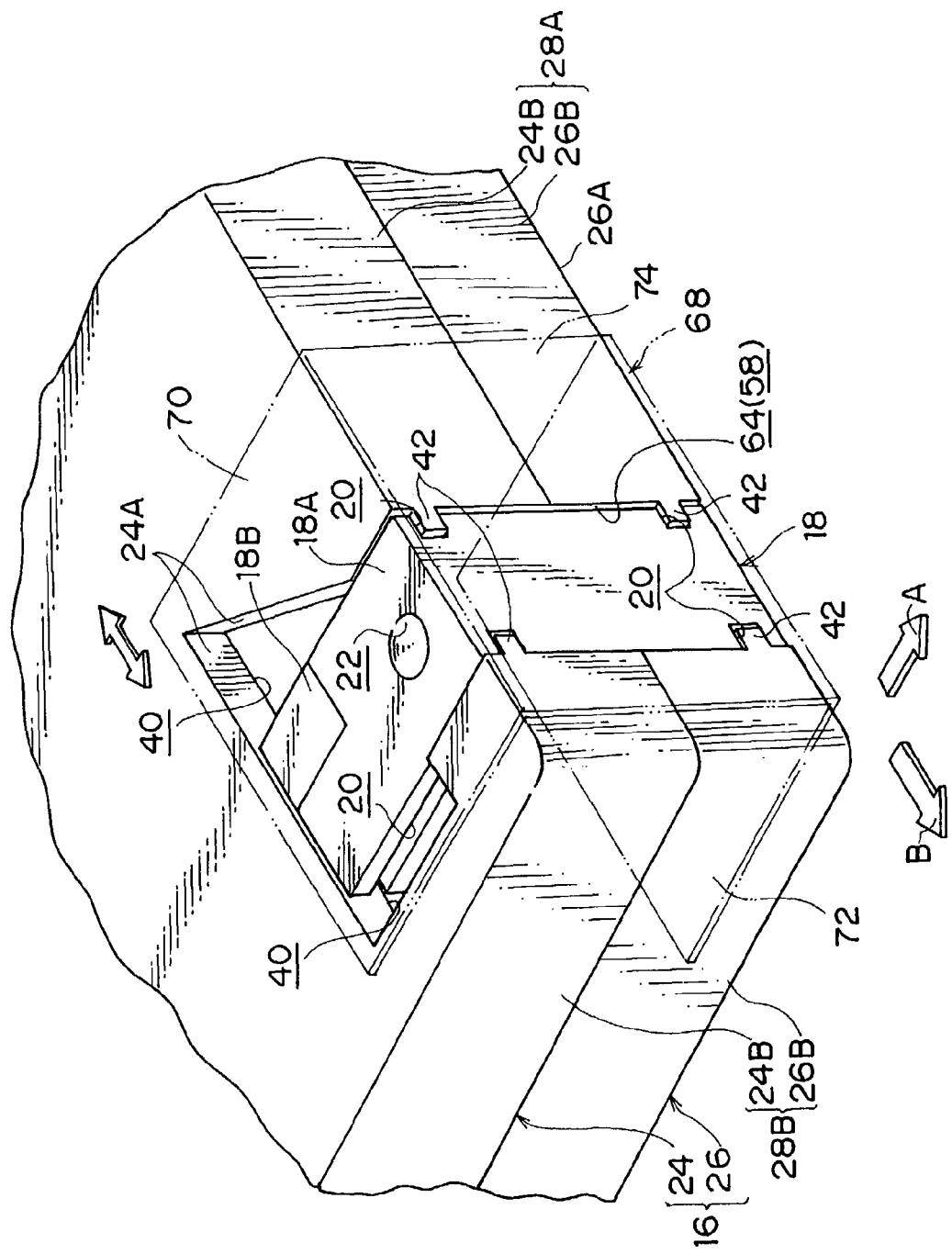
FIG. 9 is a perspective view showing yet another variant example of the leader block-retaining portion relating to the fourth or fifth variant example of the recording tape cartridge relating to the embodiment of the present invention.

Correspondingly, a height of the leader block 18 is reduced to the opening height of the opening 40 (a facing separation between the ceiling plate 24A and the floor plate 26A), and positions at which the rails 42 are disposed are altered in directions such that the upper and lower rails 42 are closer together. Furthermore, instead of the guide grooves 20 and rails 42, regions of the ceiling plate 24A and floor plate 26A that cover a portion of the leader block-retaining portion 58 or 64 may prevent detachment of the leader block 18 in the vertical direction and, together with the wall bodies 60 and 62 (or wall body 66), may be provided with the function of guiding means for restricting the mounting/removal direction of the leader block 18 to the direction of arrow A. Further, as shown in FIG. 9, a shutter 68 may be provided. The shutter 68 covers the leader block-retaining portion 58 or 64 in which the leader block 18 is accommodated from above and below, and prevents the ingression of dust and the like through the opening 40. At the shutter 68, a pair of upper and lower covering pieces 70 and 72, which are slideable against the ceiling plate 24A and floor plate 26A, respectively, are joined by a connecting portion 74, which is slideable against the front wall 28A. Thus, the shutter 68 is formed in a substantially three-sided box shape in sectional view.

That is, the shutter 68 has a structure which continuously covers the leader block-retaining portion 58 or 64 from above and below with the covering pieces 70 and 72. The shutter 68 is slid leftward by an operation of loading the recording tape cartridge 10 at a drive device, to allow access of the drawing-out means 48 to the leader block 18. Well-known structures that are employed with floppy discs (R), MDs and the like can be employed as a structure for driving the shutter 68. Thus, the leader block 18 of the present invention may have the function of closing off the opening 40.

In the second to fifth variant examples, because the wall body 55 or the like is shorter than the wall body 38 or the like, the projection 44 and leaf spring 46 are respectively positioned slightly forward relative to the case of the leader block-retaining portion 34. Correspondingly, the retention recess portion 23 of the leader block 18 is also positioned forward (not shown in the drawings).

Figure 10:
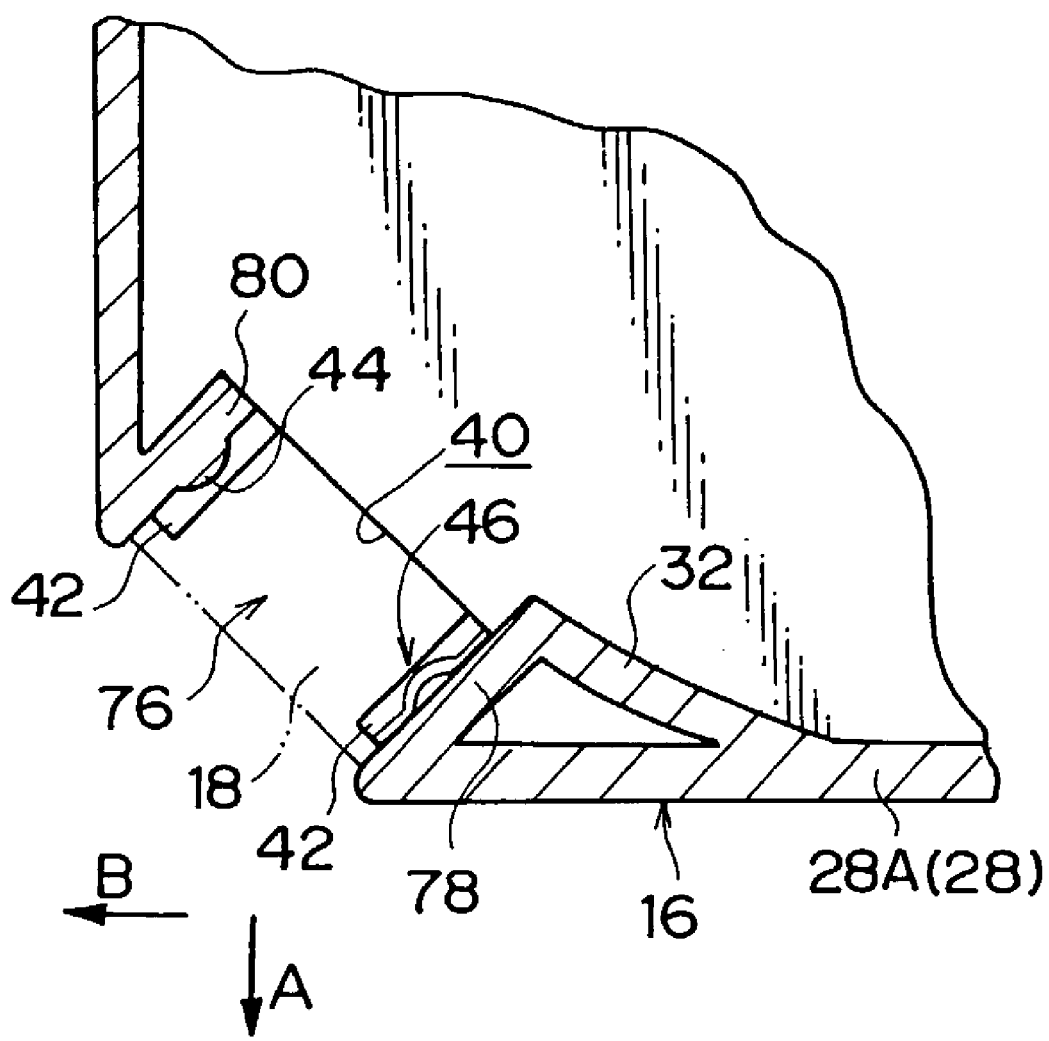
FIG. 10 is a sectional plan view showing a leader block-retaining portion relating to a sixth variant example of the recording tape cartridge relating to the embodiment of the present invention.
Figure 12A:
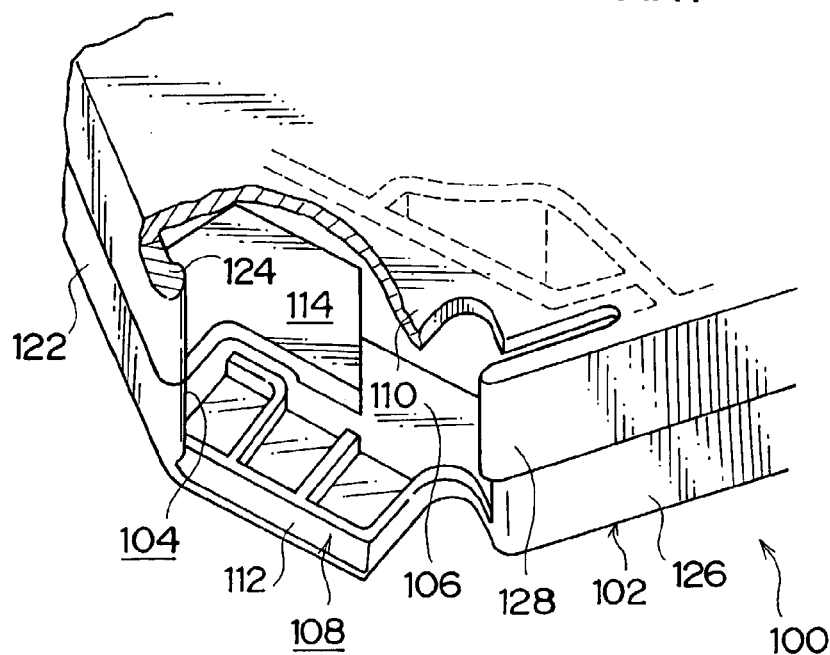
FIG. 12A is a perspective view showing a leader block-retaining portion and opening of a conventional recording tape cartridge.
Figure 12B:
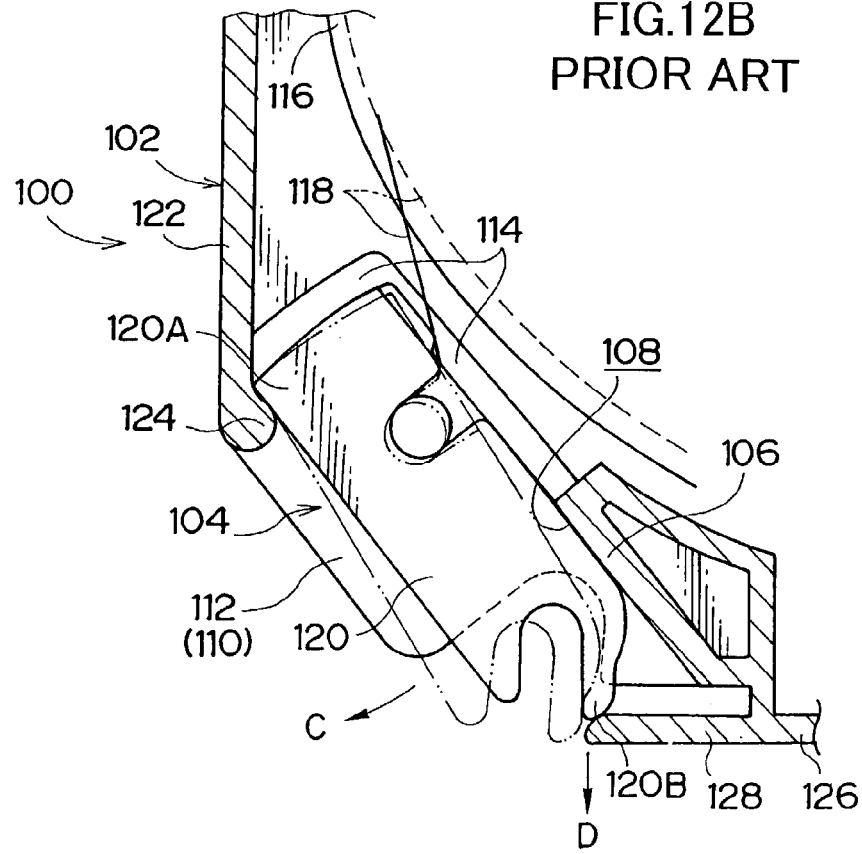
FIG. 12B is a sectional plan view showing the leader block-retaining portion and opening of the conventional recording tape cartridge.

Further, the earlier-described embodiment and the variant examples have preferable structures in which the leader block-retaining portion 34, 50, 54, 58 or 64 is disposed away from the corner portion of the case 16. However, the present invention is not limited thus. For example, the structure of a sixth variant example shown in FIG. 10 is also possible. As shown in this drawing, a leader block-retaining portion 76 relating to the sixth variant example is provided at a front-right corner portion of the case 16, and is angled with respect to the direction of arrow A.

This leader block-retaining portion 76 is provided with a wall body 78 and a wall body 80. The wall body 78 is provided joining the front wall 28A and the free play-restricting walls 32, and joins the ceiling plate 24A with the floor plate 26A. The wall body 80 is provided joining the right side wall 28B and joins the ceiling plate 24A with the floor plate 26A. The opening 40 is formed at a rear end of the wall bodies 78 and 80. Thus, the leader block-retaining portion 76 faces in both the direction of arrow A and the direction of arrow B, and a range from which the drawing-out means 48 can access the leader block 18 is widened. As a result, a degree of freedom of design of drive devices is improved.

In structures relating to this sixth variant example, the leader block-retaining portion 76 provides the same effects as the earlier-described embodiment, except for effects due to positioning away from the corner portion of the case 16.

FIG. 11A shows a leader block 82 relating to a seventh variant example. The leader block 82 differs from the leader block 18 in that an engaging slit 86, which is capable of engaging with an engaging pin 84A of drawing-out means 84, is provided in place of the pair of upper and lower engagement recess portions 22. The engaging slit 86 is formed in a hooked shape in plan view. The engaging slit 86 is provided to open at a front face of the leader block 82 in the state in which the leader block 82 is accommodated in the leader block-retaining portion 34 or the like, and to vertically penetrate through the leader block 82.

Thus, when the magnetic tape 12 is to be drawn out from the case 16, the engaging pin 84A is inserted through a front face opening portion 86A of the engaging slit 86, engages with (hooks onto) an inflected portion 86B which is inflected in the hooked shape, and takes the leader block 82 out in the direction of arrow A.

FIG. 11B shows a leader block 88 relating to an eighth variant example. The leader block 88 differs from the leader block 18 in that the leader block 88 is provided with an engaging recess portion 92, which is engageable with an engaging pin 90A of drawing-out means 90, in place of the pair of upper and lower engagement recess portions 22. The engaging recess portion 92 is formed in a substantial 'U' shape in plan view. The engaging recess portion 92 is formed so as to open at a front face of the leader block 88 in the state in which the leader block 88 is accommodated in the leader block-retaining portion 34 or the like, and to vertically penetrate through the leader block 88. A portion at an inner (deeper) side from a front face opening portion 92A and at a lower portion of the engaging recess portion 92 is an engaging portion 92B, which is a circular periphery portion with a greater radius than the front face opening portion 92A. The engaging portion 92B opens downward.

The engaging pin 90A is formed to be capable of passing through the front face opening portion 92A of the engaging recess portion 92. A distal end of the engaging pin 90A is provided with a large radius portion 90B, which can enter the engaging portion 92B from below but cannot pass through the front face opening portion 92A.

Thus, when the magnetic tape 12 is to be drawn out from the case 16, from a state in which the large radius portion 90B is positioned lower than a lower end face of the leader block 88, the engaging pin 90A advances into the engaging recess portion 92 through the front face opening portion 92A, the large radius portion 90B is raised, and the large radius portion 90B enters into the front face opening portion 92A. Hence, the drawing-out means 90 engages (hooks) the large radius portion 90B against a front end portion of the engaging portion 92B, and takes the leader block 88 out in the direction of arrow A.

Obviously, structures provided with the leader block 82 and leader block 88 relating to the seventh and eighth variant examples also provide all the same effects as the earlier-described embodiment. That is, for the present invention, it is sufficient that the leader block 18 or the like can be mounted and removed at the leader block-retaining portion 34 having the above-described structure or the like. Thus, the present invention is not limited in terms of structure, method of removal of the leader block 18 or the like, and the like.

Note that the present invention is not limited to the structures respectively illustrated by the above-described embodiment and variant examples. The present invention can have a structure in which principal structural elements of the respective illustrated structures are appropriately combined (and/or substituted). Thus, for example, the leader block-retaining portion 34 could be covered by the shutter 68, and the respective rear ends of the wall bodies 36 and 38 could be specified to be free-standing ends, like the wall body 55.

Furthermore, in the above-described embodiments and variant examples, the opening 40 has a structure in which left and right peripheral portions thereof are essentially defined by the pair of wall bodies 36 and 38. However, the present invention is not limited thus. For example, a structure in which a seat wall body joining the wall bodies 36 and 38 and joining the ceiling plate 24A and floor plate 26A is provided, and in which the opening 40 is formed in the seat wall body is possible.

Further yet, the above-described embodiment and variant examples have structures in which the magnetic tape 12 is employed as a recording tape. However, the present invention is not limited thus. It is sufficient that the recording tape is one of long tape-form information recording/replaying media which can record information and replay information that has been recorded. Of course, the recording tape cartridge relating to the present invention can be applied to recording tape of any kind of recording/replaying system.

As described above, a recording tape cartridge relating to the present invention has excellent effects in that surroundings of an opening aperture for drawing out recording tape have high strength and are resistant to deformation.

What is claimed is:

1. A tape cartridge capable of being inserted at a tape drive which carries out at least one of reading and writing of data when the tape cartridge is inserted, the tape cartridge comprising:
(I) a reel on which recording tape is wound;
(II) a leader block to which a free end of the tape is attached;
(III) a hollow case accommodating the reel, the case including a ceiling plate and a floor plate, which face one another with a predetermined spacing, and a peripheral wall which joins outer peripheries of the ceiling plate and floor plate; and
(IV) a leader block-retaining portion including a recess formed in the case so as to extend from the ceiling plate to the floor plate via the peripheral wall, the recess formed by a pair of wall bodies which oppose one another and an opening aperture formed between case inward side end portions of the two wall bodies, the recess being capable of accommodating the leader block, and the opening aperture being covered by the leader block when the leader block is accommodated at the recess;
wherein one of the wall bodies comprises an urging member which urges the leader block to the other wall body side when the leader block is accommodated,
wherein each said wall bodies has a wall portion, and the wall portion of one of said wall bodies is formed parallel to the wall portion of the other of said wall bodies, wherein the leader block comprises at least one guide groove,
wherein the wall bodies comprises at least one rail capable of engaging with and guiding the at least one guide of the leader block when the leader block is being accommodated; and
wherein the leader block comprises at least one guide.

2. The tape cartridge of claim 1, wherein the at least one guide groove and rail extend in a direction of insertion of the cartridge.

3. A tape cartridge capable of being insert at a tape drive which carries out at least one of reading and writing of data when the tape cartridge is inserted, the tape cartridge comprising:
(I) a reel on which recording tape is wound;
(II) a leader block to which a free end of the tape is attached;
(III) a hollow case accommodating the reel, the case including a ceiling plate and a floor plate, which face one another with a predetermined spacing, and a peripheral wall which join outer perpheries of the ceiling plate and floor plate; and
(IV) a leader block-retaining portion including a recess formed in the case so as to extend from the ceiling plate to the floor plate via the peripheral wall, the recess formed by a pair of wall bodies which oppose one another and an opening aperture formed between case inward side end portions of the two bodies, the recess being capable of accommodating the leader block, and the opening aperture being covered by the leader block when the leader block is accommodated at the recess;
wherein one of the wall bodies comprises an urging member which urges the leader block to the other wall body side when the leader block is accommodated, and wherein a direction of an urging force provided by the urging member is directed at a surface of the other of the wall bodies, wherein the leader block comprises at least one guide groove,
wherein the wall bodies comprises at least one rail capable of engaging with and guiding the at least one guide of the block when the leader block is being accommodated; and
wherein the leader block comprises at least one guide.

4. The tape cartridge of claim 3, wherein the at least one guide groove and rail extend in a direction of insertion of the cartridge.

* * * * *